United States Patent
Rider

(10) Patent No.: US 8,567,873 B2
(45) Date of Patent: Oct. 29, 2013

(54) WHEEL HUB

(75) Inventor: Scott W. Rider, Lawson, MO (US)

(73) Assignee: Weld Racing, LLC, Kansas City, MO (US)

( * ) Notice: Subject to any disclaimer, the term of this patent is extended or adjusted under 35 U.S.C. 154(b) by 402 days.

(21) Appl. No.: 12/822,019

(22) Filed: Jun. 23, 2010

(65) Prior Publication Data

US 2010/0320830 A1 Dec. 23, 2010

Related U.S. Application Data

(60) Provisional application No. 61/219,643, filed on Jun. 23, 2009.

(51) Int. Cl.
*B60B 27/00* (2006.01)
*B60B 3/04* (2006.01)

(52) U.S. Cl.
USPC .................................. 301/64.101; 301/105.1

(58) Field of Classification Search
USPC ............. 301/6.1, 9.1, 10.1, 11.1, 12.1, 35.61, 301/63.101, 64.101, 66, 67, 105.1, 112; 152/396; D12/207
See application file for complete search history.

(56) References Cited

U.S. PATENT DOCUMENTS

| | | | | |
|---|---|---|---|---|
| 1,851,187 A * | 3/1932 | Keller | .......................... | 301/12.1 |
| 4,982,998 A * | 1/1991 | Mikawa | ....................... | 301/11.1 |
| 5,275,471 A * | 1/1994 | Nutzmann | ................... | 301/10.1 |
| 5,320,420 A * | 6/1994 | Gilliam | ........................ | 301/11.1 |
| 6,095,617 A | 8/2000 | Bertetti | | |
| 6,773,077 B2 * | 8/2004 | Buell et al. | ..................... | 301/104 |
| 7,314,256 B1 * | 1/2008 | Haines | ....................... | 301/108.5 |
| 2004/0032161 A1 * | 2/2004 | Smyth | ............................ | 301/9.1 |

FOREIGN PATENT DOCUMENTS

JP 63028703 A * 2/1988
WO WO 9013444 A1 * 11/1990

OTHER PUBLICATIONS

Weld Racing, Oval Track Wheels, Weld Racing 1996 W.D. Price Schedule, p. 5, Weld Racing, USA.

* cited by examiner

*Primary Examiner* — Kip T Kotter
(74) *Attorney, Agent, or Firm* — Erickson Kernell Derusseau & Kleypas, LLC

(57) ABSTRACT

A hub for a wheel having a low mass and low moment of inertia includes a tubular body with a bore having, and three radially-extending arms that terminate with a tab. The hub is adapted for mounting on the radial flange of a wheel rim. The arms are space 120 degrees apart and extend from the body tapering from a relatively thick and wide portion to a relatively narrow and thin portion. A bore in the tab receives a fastener for securing the tab to the flange. Mounting hardware including spacers, bearings, O-rings, and an oil seal are secured within the body bore for mounting the hub onto the spindle of a vehicle steering mechanism. A hub nut and cotter pin secures the hub to the spindle. A center cap covers the open end of the body. The hub may optionally include three flanges for mounting a brake rotor.

20 Claims, 9 Drawing Sheets

WHEEL HUB

CROSS-REFERENCE TO RELATED APPLICATIONS

This application claims priority in U.S. Provisional Patent Application No. 61/219,643 filed Jun. 23, 2009, which is incorporated herein by reference.

BACKGROUND OF THE INVENTION

1. Field of the Invention

The present disclosed technology relates generally to a hub for a wheel. More specifically, the invention provides a wheel hub for use on a wheel in high rotational speed and high torque applications.

2. Description of the Related Art

Wheels used on vehicles subject to high rotational speed and high torque environments, such as sprint racecars, require special wheels that are light weight, strong, and capable of withstanding the harsh racing environment. Racecar builders desire to increase the efficiency of their racecars by decreasing the overall weight of the racecar. It is well known in the automotive industry that components which rotate increase the dynamic load on the racecar, and require more kinetic energy (i.e. horsepower) to rotate those components and move the vehicle. Racecar and engine builders call this kinetic energy the angular moment of inertia or "rotating weight." One such component having rotating weight is the wheel. The wheel may include a central hub and rim, all of which are rotatively connected to the drive shaft of the racecar engine. In high speed and high torque applications, the wheel experiences high rotational speed coupled with a large down force. The wheel must have sufficient strength to withstand this harsh environment.

Wheels incapable of withstanding the harsh racing environment suffer structural failures that often result in damage to the vehicle as well as damage to surrounding structures or bystanders. An example of such a harsh racing environment may include the racing conditions often experienced in sprint car racing, midget car racing, and other dirt track racing environments. As such, wheels used in the aforementioned applications must be of sufficient strength to withstand the impact of other vehicles, and impact with the racetrack barrier, which may vary from an energy absorbing "soft wall," to concrete.

One approach to the design of high strength and lightweight wheels utilizes a hub mechanically fastened to a rim shell. The separate hub and rim configuration allows for the rim shell to be replaced in the event of damage, such as the wheel striking another vehicle, obstacle, or racetrack barrier. This design configuration also provides options for various hub designs to be fastened to a standard rim shell, and for minimizing the weight of the wheel.

The weight or mass of a rotating wheel about an axis may be described in terms of its moment of inertia, which is expressed by the equation: $I_{axis} = \frac{1}{2}(\text{mass} \times \text{radius}^2)$, where "I" is the moment of inertia at the axis of rotation, "mass" is the mass of the rotating wheel, and "radius" is the distance from the axis of rotation to the edge of the wheel. Hence, the lower the mass of the wheel, the lower the moment of inertia of the rotating wheel. As seen in the equation above, the most efficient method of reducing the rotational moment of inertia is to decrease the radius (i.e., diameter) of the wheel. This may not be an option for some racing applications in which the sanctioning body specifies a diameter, or a range of diameters, of the wheels that may be used. In addition, decreasing the diameter of the wheel may have other disadvantages in applications that rely on the front wheels of the race car to break a photoelectric beam passing in front of the racecar, such as the beam used to count laps or track racing time. As such, a large diameter wheel traveling the same linear speed as a smaller diameter wheel will break the photoelectric beam before a smaller diameter wheel.

An alternative approach to reducing the moment of inertia of a wheel is to decrease the mass of the wheel. Various methods may be used to reduce the mass of the wheel, such as by material selection, reducing the thickness of the wheel components, or removing material from the wheel rim or hub that is not structurally needed. However, decreasing the mass of the wheel requires careful structural analysis of the wheel, the effect it will have on the strength of the wheel, and its ability to withstand racing conditions.

Therefore, there is a need for a wheel hub that has a reduced mass or moment of inertia, and the structural strength necessary for racing or high performance vehicle applications. Heretofore there has not been available a wheel hub with the features and advantages of the disclosed subject matter.

SUMMARY OF THE INVENTION

In a hub embodying the principles of the disclosed subject matter, weight is reduced, and structural strength is maximized by radially-extending arms from a tubular body, and tapering the arms toward a tab that contacts a radial flange on a wheel rim. Such design characteristics of the hub, as well as additional weight-saving attributes, substantially decreases the mass and static weight of the hub thereby reducing the moment of inertia of the hub and wheel.

The tubular body has a wall with an outer surface, and inner surface defining a bore. Three arms are spaced 120 degrees apart and extend radially from the top tubular body. The arms extend from the body tapering from a relatively thick and wide portion to a relatively narrow and thin end portion. The top surface, bottom surface, and side edges of the arms blend into the outside surface of the body. The tab extends from the arm and flares from a narrow portion to a broad portion. The tab has a ledge for receiving the flange of the rim, and a bore for receiving a fastener for securing the arms of the hub to the flange.

The hub may be installed on the spindle of the steering mechanism of a vehicle using mounting hardware. Mounting hardware including spacers, gearings, O-rings, and an oil seal are fixed within the bore of the body. The hub is secured to the spindle by a threaded nut and cotter pin. A center cap may be installed over the exposed end of the hub body to prevent dirt and debris from entering the bore of the hub.

The hub may optionally include three flanges for mounting a brake rotor.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED EMBODIMENT

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

Figure 1:
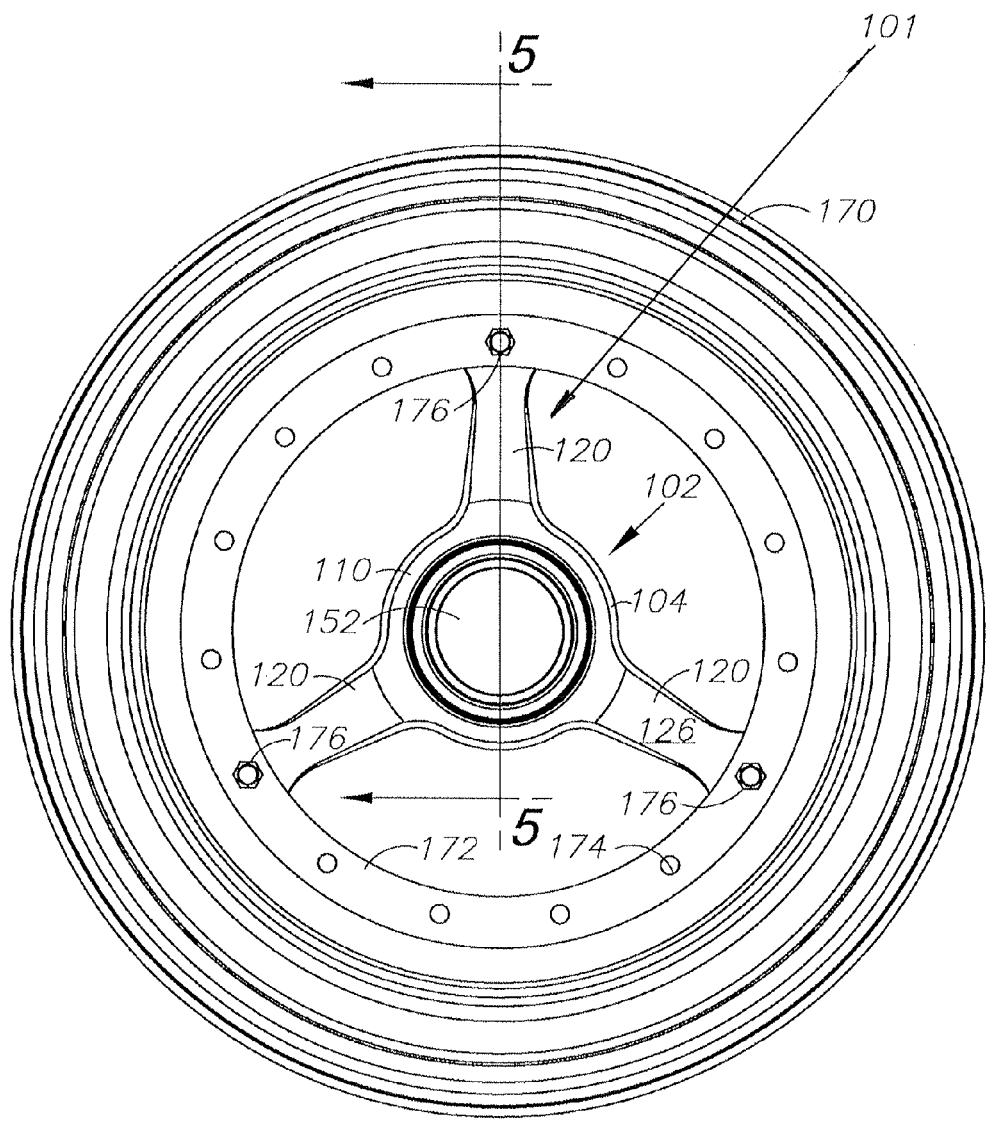
FIG. 1 is a front elevational view of a multi-part wheel utilizing an improved hub embodying principles of the disclosed subject matter where the hub is fastened within the wheel rim.

Referring to the drawings in more detail, the reference numeral 102 generally designates an improved wheel hub embodying the principles of the disclosed subject matter having a reduced mass or moment of inertia, and the structural strength necessary for racing or high performance vehicle applications. Referring to FIG. 1, hub 102 is shown as part of a hub assembly 101 secured to an annular flange 172 of a rim 170, thereby creating a wheel for the mounting of a tire (not shown). Rim 170 may be composed of high strength materials including, but not limited to steel, titanium, magnesium, aluminum, or alloys thereof, and may be forged, machined from billet or cast with finishing machining Hub assembly 101 and rim 170 are typically used with natural rubber tires, synthetic rubber tires, or combinations thereof. Hub 102 may be manufactured from metal, preferably an aluminum alloy such as aluminum alloy 5052 or 6061-T6 or other high-strength, light weight alloy. Hub 102 may consist of multiple components of varying metals secured together, but is preferably machined from a homogeneous metal starting material into a monolithic component.

Figure 2:
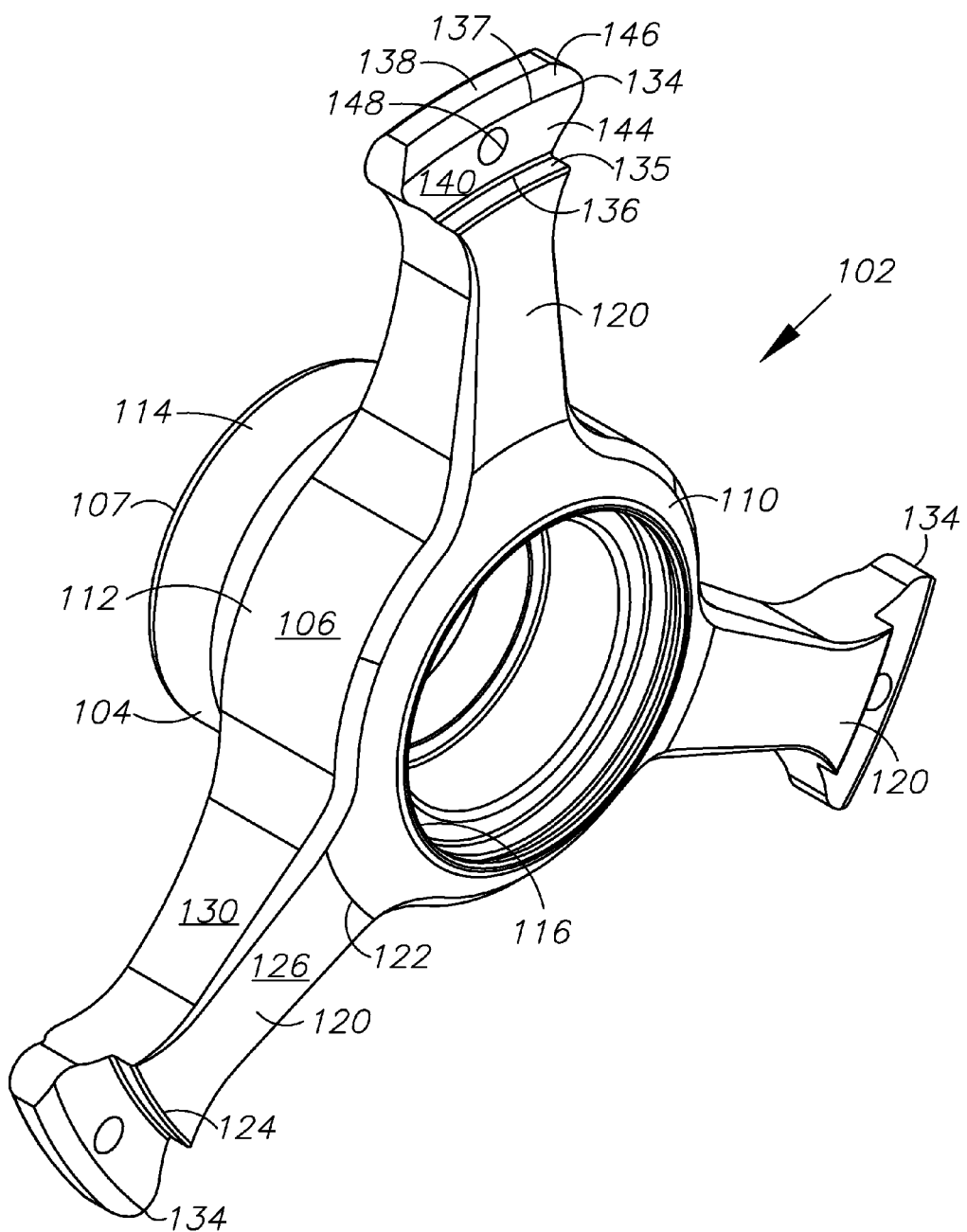
FIG. 2 is a perspective view of the improved hub.
Figure 3:
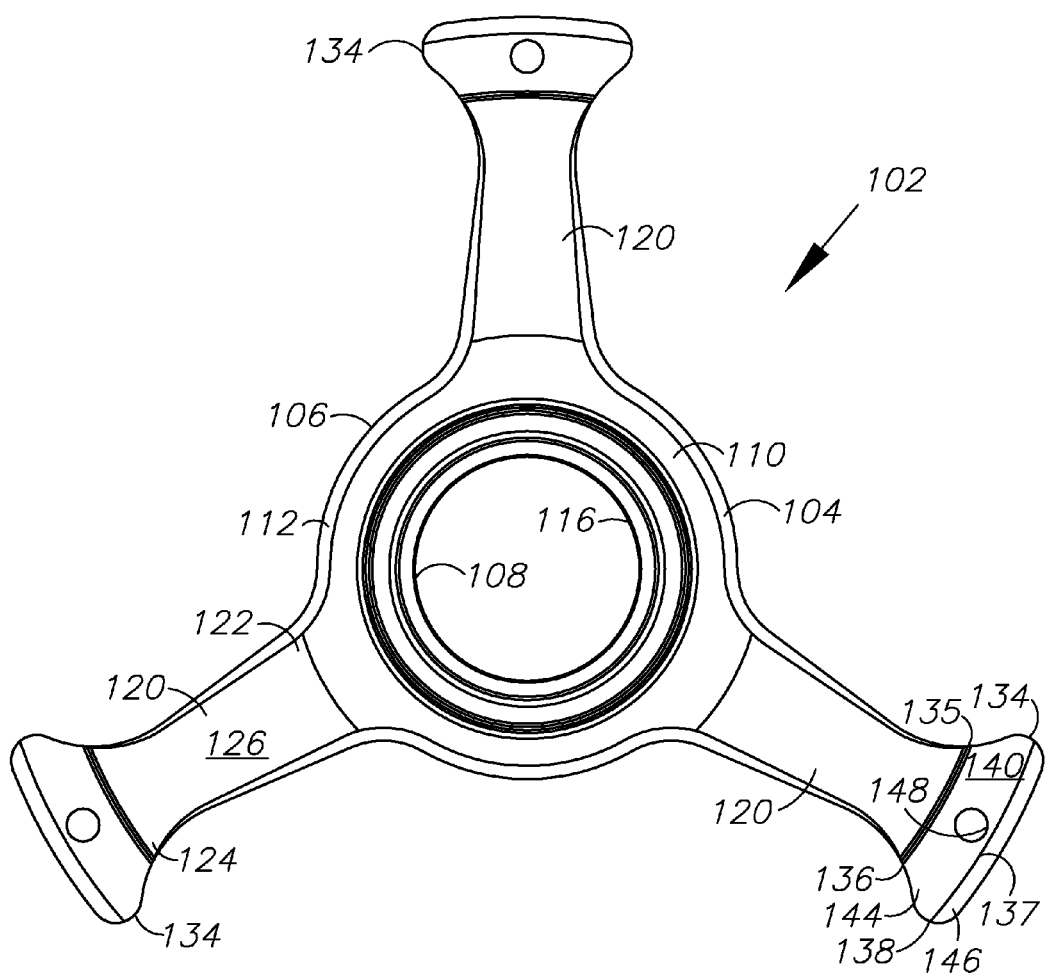
FIG. 3 is a top plan view of the improved hub.
Figure 4:
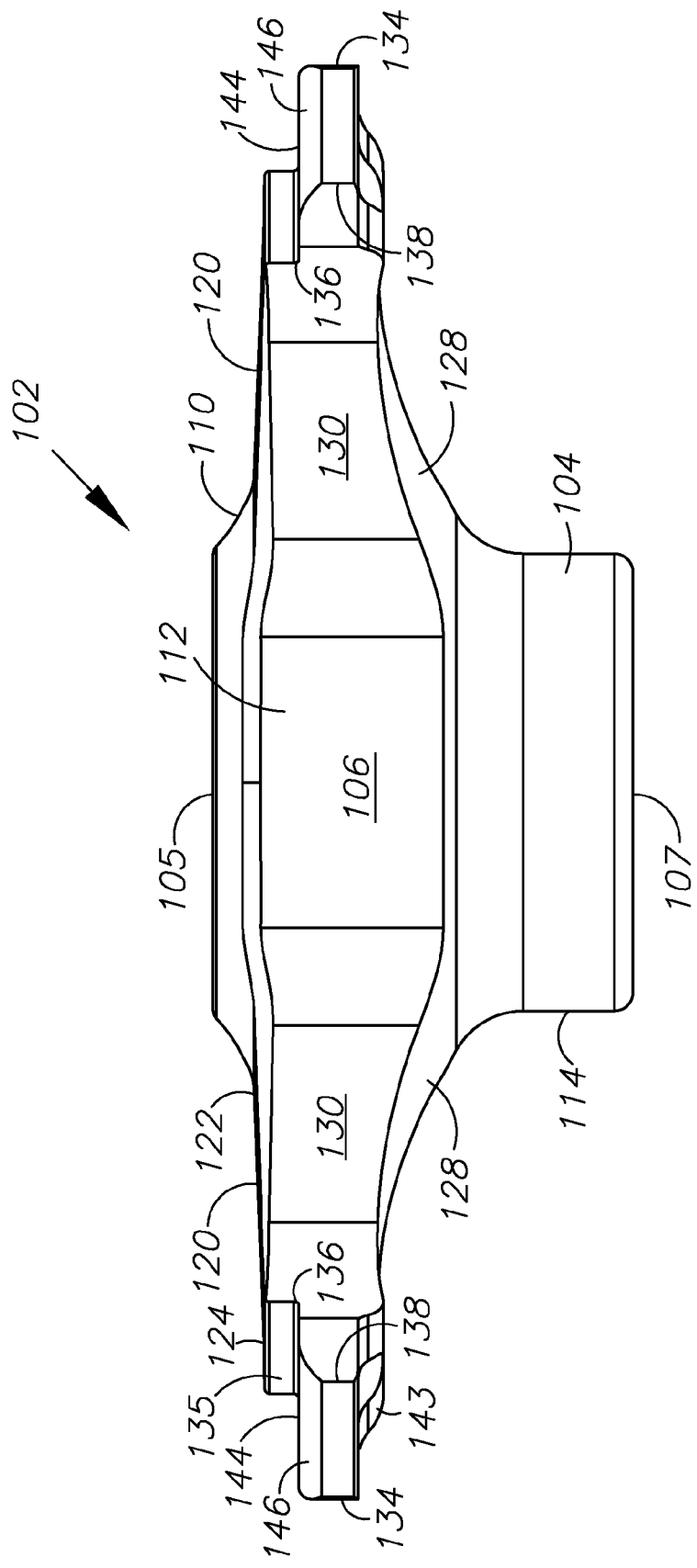
FIG. 4 is an elevational view of the improved hub.

FIGS. 2-4 show improved hub 102. Referring to FIG. 3, the top of hub 102 is shown. The top of hub 102 may also be identified as the outboard or face side of the hub as it can be seen when mounted on a vehicle. Conversely, the bottom of hub 102 may also be identified as the inboard side of the hub. Returning to the drawings, hub 102 includes a body 104 having arms 120 radiating therefrom. The generally tubular body 104 extends between a top end 105 and a bottom end 107. Body 104 further includes an upper body portion 112, a lower body portion 114, a wall outer face 106, and a wall inner face 108. The thickness between wall outer face 106 and wall inner face 108 of lower body portion 114 may be less than that of the wall thickness of upper body portion 112 to eliminate unnecessary weight. Top end 105 may have a shoulder 110 that blends into top face 126 of arms 120. Inner face 108 of a central bore 116 extending between top end 105 and bottom end 107 is machined and tapered to receive mounting hardware and a spindle (not shown) for mounting hub 102 on a vehicle.

Arms 120 are orientated 120 degrees to each other and have a top face 126, a bottom face 128, and opposite edges 130, and extend radially from wall outer face 106 tapering from a relatively thick and wide proximal end portion 122 to a relatively thin and narrow distal end portion 124. Edges 130 of arm 120 blend into body 104 of outer face 106 of upper body portion 112. A bottom face 128 extends from distal end 124 toward proximal end 122 blending downward into wall outer face 106 of lower body portion 114.

Figure 5:
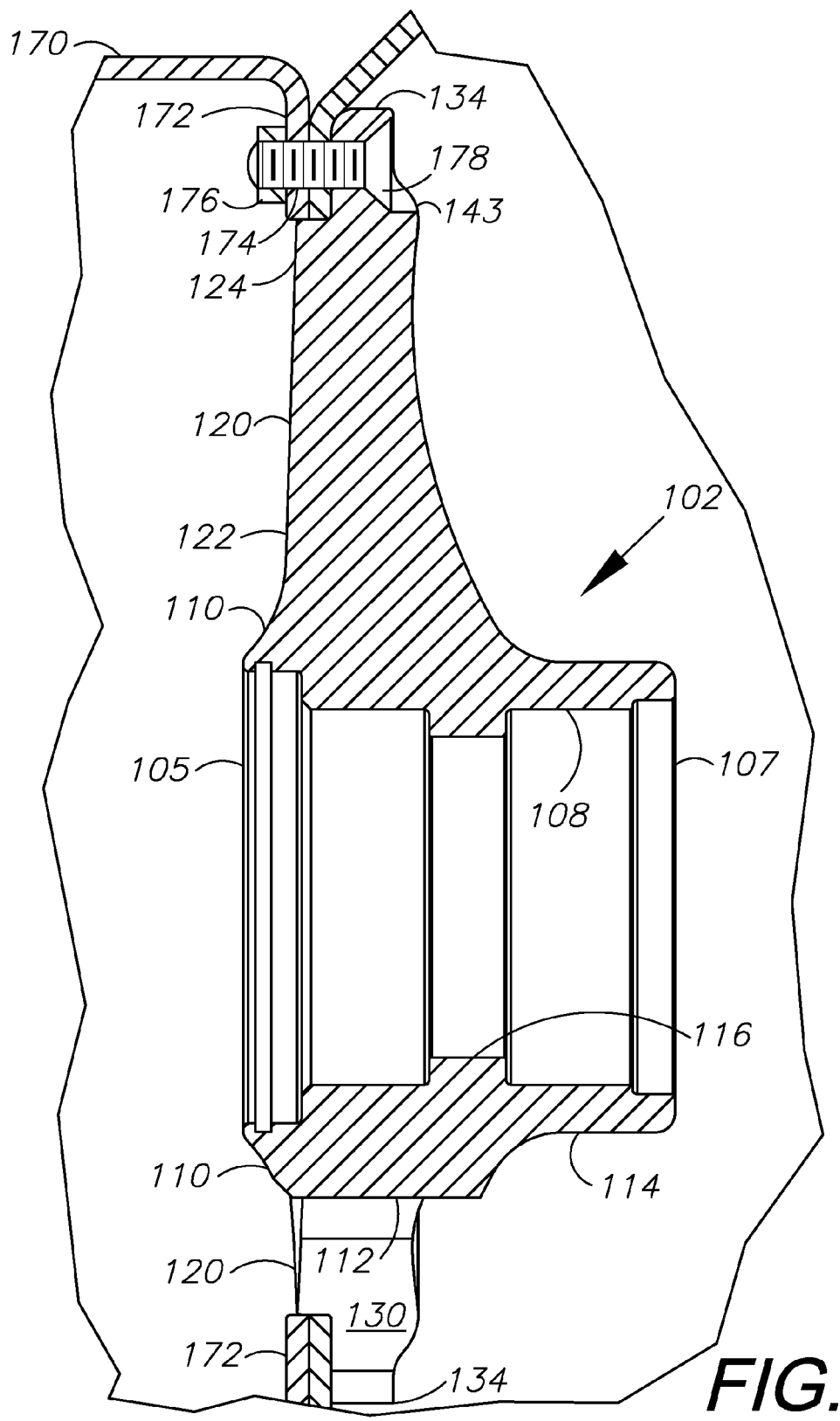
FIG. 5 is a sectional view of the improved hub and rim connection taken generally along line 5-5 in FIG. 1.

Distal end 124 of the top of arm 120 terminates at a tab 134 having a ledge 144 for receiving a face of the flange 172, and a bore 148 for receiving a fastener. Hub 102 is secured to flange 172 by aligning bore 148 in tab 134 with a bore 174 in flange 172, inserting a threaded fastener, such as a bolt 178 there through, and securing it with a nut 176. Tab 134 extends from arm 120 widening from a relatively thick and narrow proximal end portion 136 to a relatively thin and broad, flared distal end portion 138. Proximal end 136 of the top of tab 134 may form an arcuately-shaped convex edge 135, and distal end 138 of top face 140 of tab 134 may form an arcuately-shaped convex edge 137 having a rounded edge 146 for nesting between wheel flange 172 and rim 170 (FIG. 5). Bottom face 142 of tab 134 extends from proximal end 136 toward distal end 138 forming a concave edge 143 at proximal end 136.

Figure 6:
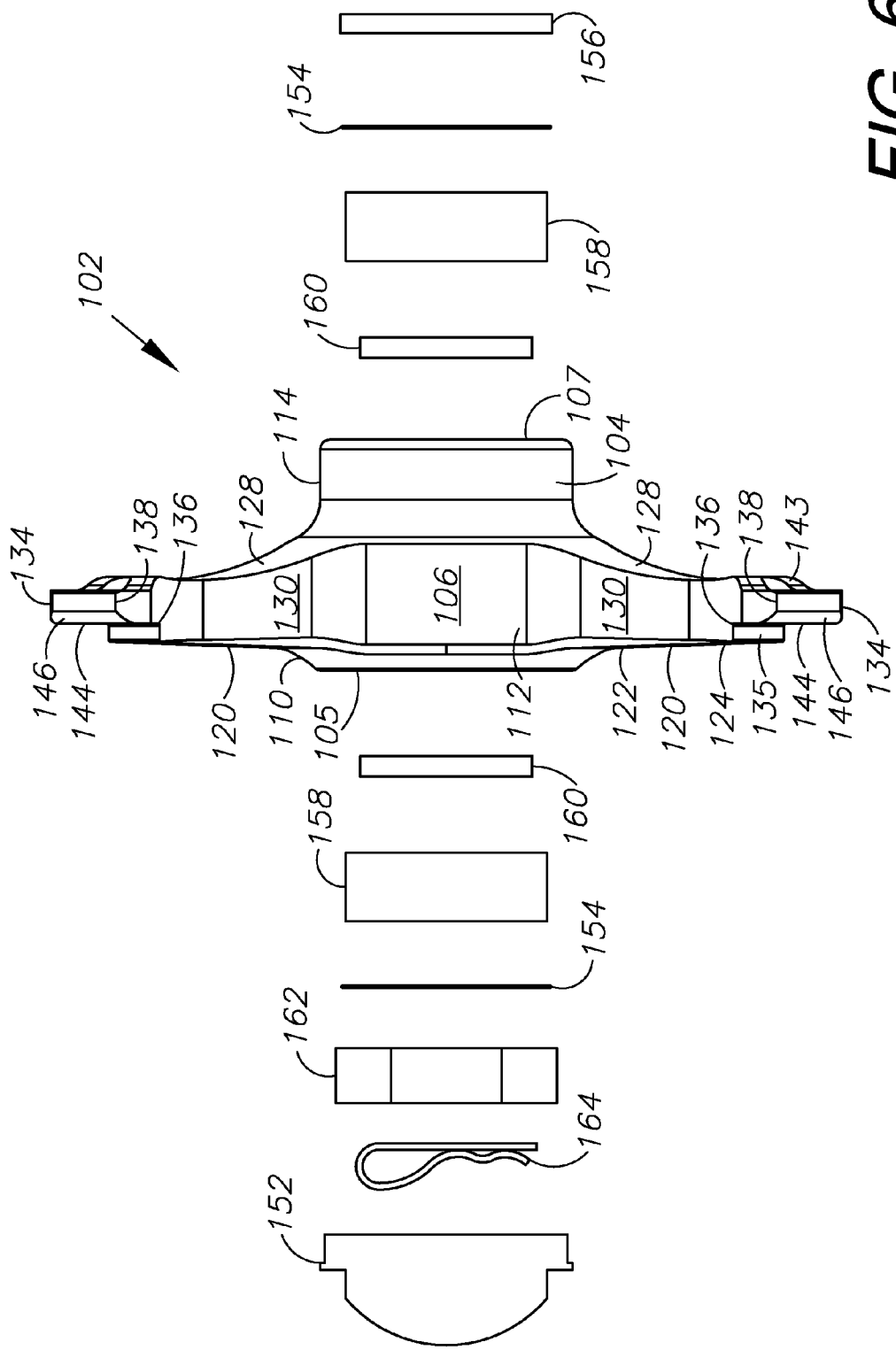
FIG. 6 is an exploded view of the improved hub showing the components of the improved hub assembly used for installation.

Mounting hardware is used to mount hub 102 and rim 170 onto the spindle of a vehicle. Referring to FIG. 6, hub 102 is shown in an exploded view with the mounting hardware used to mount hub 102 on the spindle. The mounting hardware may include, but is not limited to two circular spacers 160, between two circular bearings 158, all between two O-rings 154. Additionally on the inboard side of hub 102 is a circular oil seal 156. Spacers 160, bearings 158, O-rings 154, and oil seal 156 are secured within bore 116 of hub 102, and hub 102 is mounted on the spindle of a vehicle by orientating the bottom of hub 102 toward the spindle and sliding hub 102 thereon. Hub 102 is secured to the spindle by threading a hub nut 162 onto the threaded end of the spindle, and securing nut 162 to the spindle using a cotter pin 164. Lastly, a center cap 152 is fitted into bore 116 from the outboard side of hub 102 to prevent dirt and debris from entering bore 116.

Figure 7:
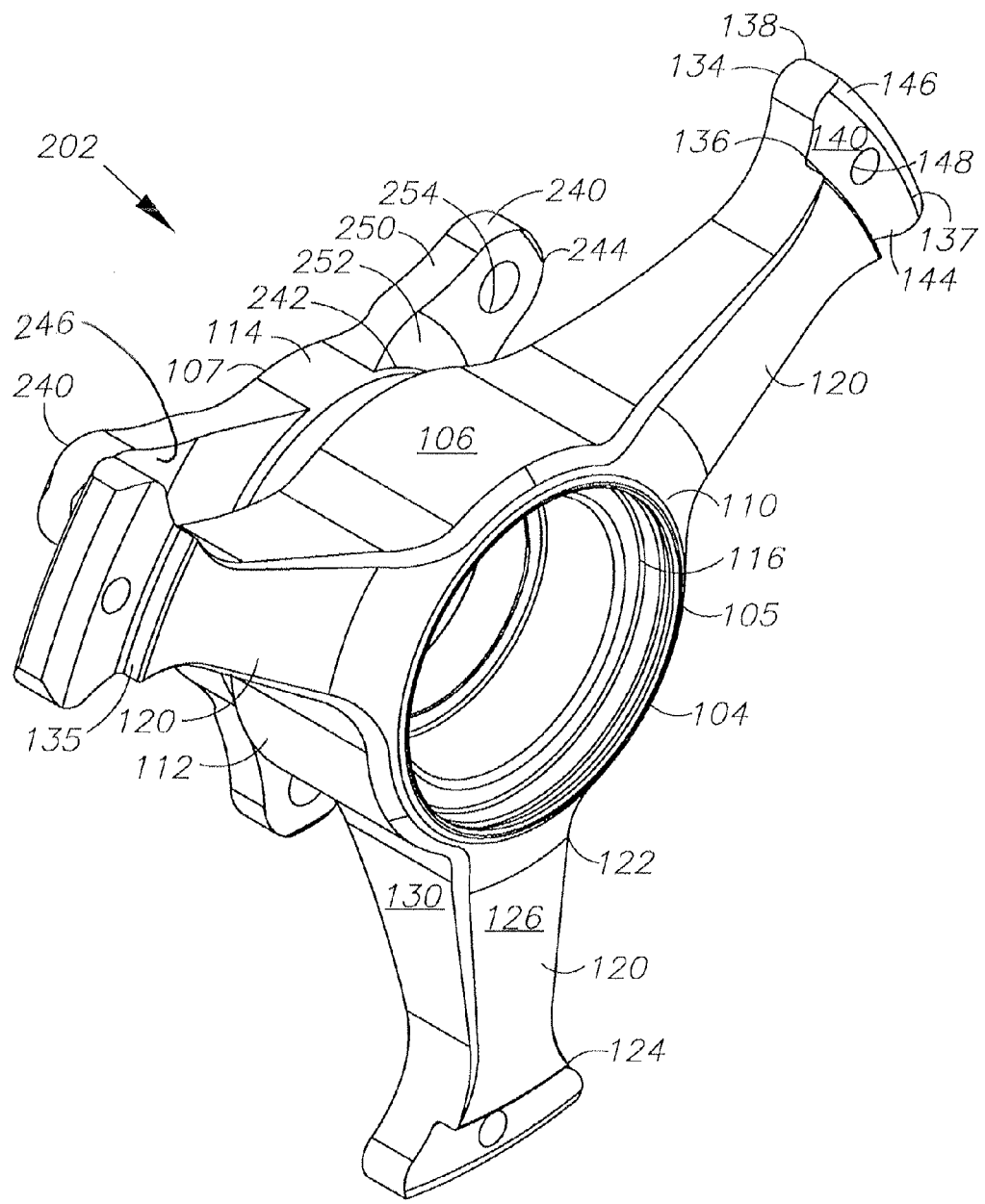
FIG. 7 is a perspective view of an alternative embodiment improved hub embodying principles of the disclosed subject matter where the bottom of the hub has a brake caliper attachment flange with engagement tabs.
Figure 8:
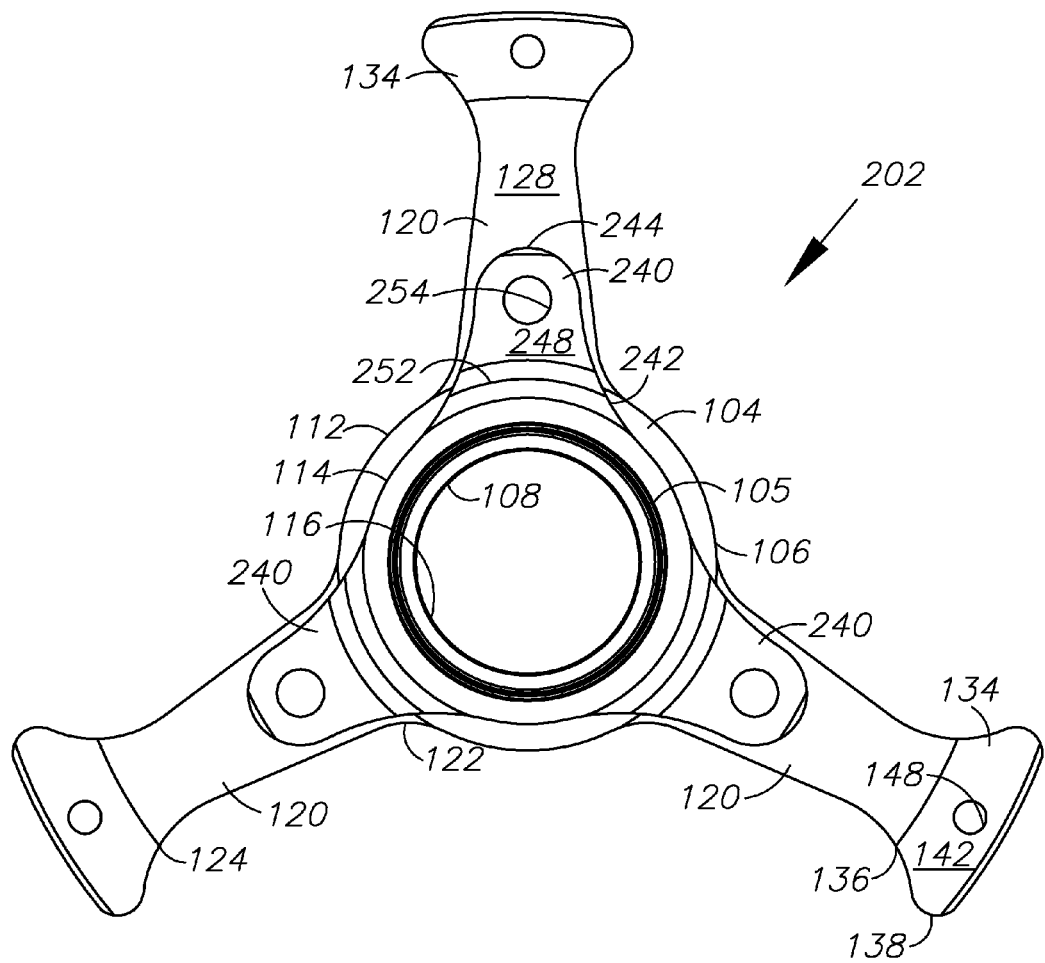
FIG. 8 is a bottom plan view of the alternative embodiment improved hub.
Figure 9:
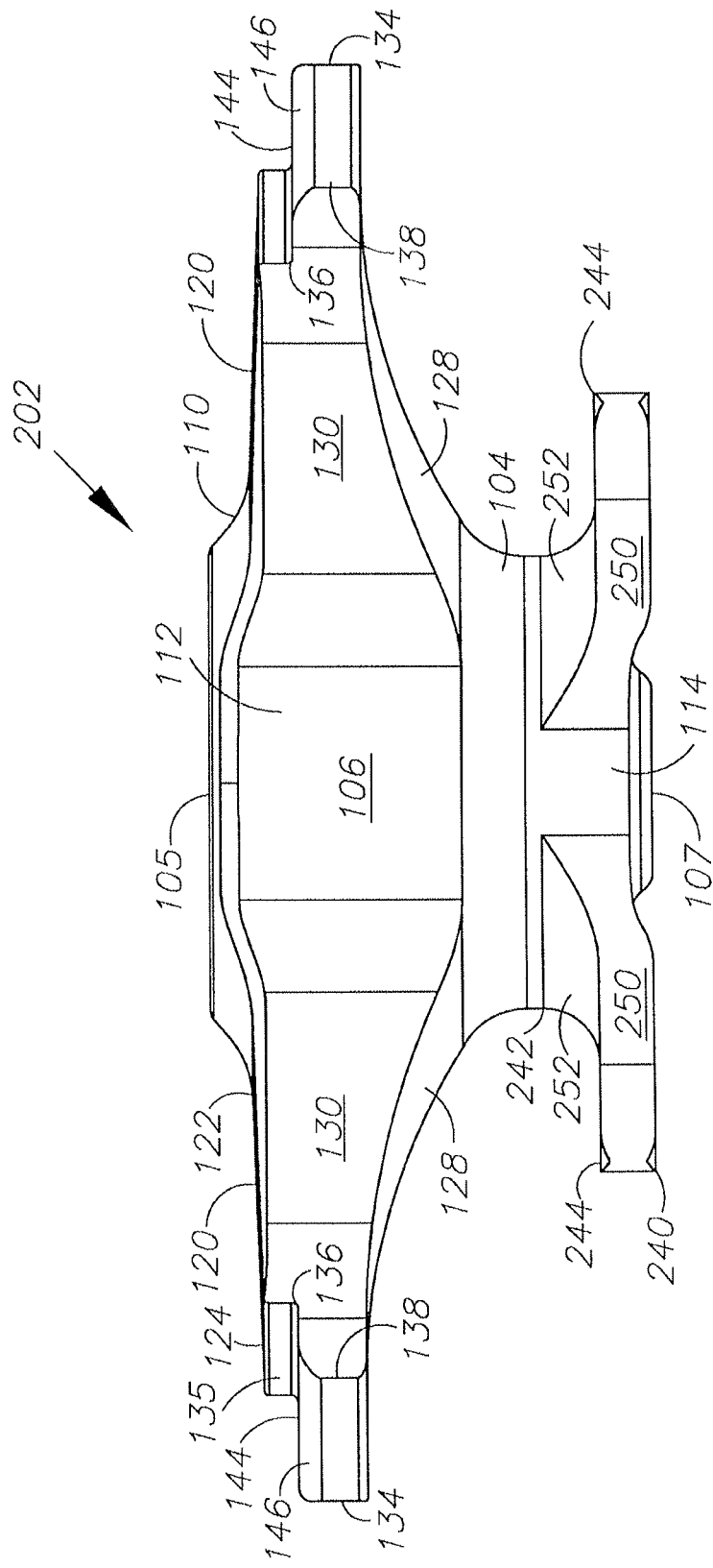
FIG. 9 is an elevational view of the improved hub.

Referring to FIGS. 7-9, the reference numeral 202 generally designates an alternative embodiment of improved wheel hub embodying the principles of the disclosed subject matter including the addition of flanges 240 for mounting a brake rotor (not shown). Flanges 240 may be located immediately below arms 120, or alternatively, may be located anywhere on lower body portion 114 whereby they are orientated 120 degrees to each other. Flange 240 has a top face 246, a bottom face 248, and opposite edges 250, and extends radially from body 104 and wall outer face 106 tapering from a relatively thick and wide proximal end portion 242 to a relatively thin and narrow distal end portion 244. Edges 250 of flange 240 blend into body 104 and wall outer face 106. Distal end 244 of flange 240 includes a bore 254 for receiving brake caliper mounting hardware such as a threaded fastener. Flange 240 top face 246 may have a fillet 252 at proximal end 242 that blends into wall outer face 106 of lower body portion 114.

Bottom face 128 of arm 120 extends from proximal end of tab 134 toward body 104 and blends into outer face 106 of lower body portion 114.

In use, a brake rotor is mounted to hub 202. Hub 202 with installed mounting hardware is then attached to the flange of a rim, and mounted on a spindle as described above.

It will be appreciated that the aforementioned structural characteristics, shape, and manufacturing materials of wheel hubs 102, 202 result in a wheel hub having a reduced mass and static weight of over 30 percent when compared to conventional hubs which reduces the rotational moment of inertia by over 61 percent. Moreover, the aforementioned hubs 102, 202 have the high strength necessary for use in high performance applications and harsh racing conditions. It will also be appreciated that hubs 102, 202 may be used for various other applications. Moreover, hubs 102, 202 may be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. A wheel hub for a vehicle wheel rim, said hub comprising:
   (a) a tubular body extending between a first end and a second end and a body wall extending between said first end and said second end;
   (b) a bore extending between said body first end and said body second end;
   (c) a plurality of arms disposed at said body first end, said arms having a proximal end, a distal end, a top face, a bottom face, and opposite edges;
   (d) said arms extending radially from said body wall tapering from a relatively thick and wide proximal end portion to a relatively narrow and thin distal end portion, the edges of said arms blending into said body wall at said first end of said body, and the bottom face of said arms blending into said second end of said body;
   (e) a tab extending radially from each of said distal end portions of said plurality of arms having a proximal end, a distal end, and a top and widening from a relatively narrow proximal end to a relatively wide distal end;
   (f) a ledge disposed within said top of said tab; and
   (g) a bore through said tab.

2. The hub of claim 1, wherein:
   (a) said top of said proximal end of said tab having an arcuately-shaped convex edge; and
   (b) said top of said distal end of said tab having an arcuately-shaped convex edge and a rounded edge.

3. The hub of claim 2, wherein said body wall at said body first end is thicker than body wall at said body second end.

4. The hub of claim 3, further comprising a shoulder at said body first end that blends into said arm top.

5. The hub of claim 3, further comprising a cap disposed within said body bore at said body first end.

6. The hub of claim 2, wherein said hub is manufactured from aluminum alloy.

7. The hub of claim 6, further comprising a shoulder at said body first end that blends into said arm top.

8. The hub of claim 2, further comprising a cap disposed within said body bore at said body first end.

9. The hub of claim 1, further comprising a cap disposed within said body bore at said body first end.

10. The hub of claim 9, wherein:
    (a) said top of said proximal end of said tab having an arcuately-shaped convex edge; and
    (b) said top of said distal end of said tab having an arcuately-shaped convex edge and a rounded edge.

11. The hub of claim 10, further comprising a shoulder at said body first end that blends into said arm top.

12. The hub of claim 11 wherein said hub is manufactured from aluminum alloy.

13. The hub of claim 1, further comprising a bearing disposed within said body bore.

14. The hub of claim 1, further comprising:
    (a) a plurality of flanges disposed at said body second end having a proximal end and a distal end;
    (b) each of said flanges extending radially from said body wall tapering from a relatively wide proximal end portion to a relatively narrow end portion; and
    (c) a bore through each of said flanges.

15. The hub of claim 14, wherein said bottom face of said arm extending from said proximal end of said tab toward said body and blending into said body second end.

16. The hub of claim 15, wherein said hub is manufactured from aluminum alloy.

17. A wheel hub for a vehicle wheel rim, said hub comprising:
    (a) a tubular body extending between a first end and a second end and a body wall extending between said first end and said second end wherein said body wall at said first end is thicker than said body wall at said second end;
    (b) a bore extending between said body first end and said body second end;
    (c) a plurality of arms disposed at said body first end, said arms having a proximal end, a distal end, a top face, a bottom face, and opposite edges;
    (d) said arms extending radially from said body wall tapering from a relatively thick and wide proximal end portion to a relatively narrow and thin distal end portion, the edges of said arms blending into said body wall at said body first end, and the bottom face of said arms blending into said body wall at said body second end;
    (e) a tab extending radially from each of said distal end portions of said plurality of arms having a proximal end, a distal end, and a top and widening from a relatively narrow proximal end to a relatively wide distal end;
    (f) a ledge disposed within said tab top;
    (g) a bore through said tab;
    (h) said top of said proximal end of said tab having an arcuately-shaped convex edge; and
    (i) said top of said distal end of said tab having an arcuately-shaped convex edge and a rounded edge,
    (j) a shoulder at said body first end that blends into said arm top.

18. The hub of claim 17, further comprising a cap disposed within said body bore at said body first end.

19. The hub of claim 18, further comprising:
    (a) a plurality of flanges disposed at said body second end having a proximal end and a distal end;
    (b) each of said flanges extending radially from said body wall tapering from a relatively wide proximal end portion to a relatively narrow end portion; and
    (c) a bore through each of said flanges.

20. The hub of claim 19, wherein said hub is manufactured from aluminum alloy.

* * * * *